US011264895B2

(12) United States Patent
Giuliano et al.

(10) Patent No.: US 11,264,895 B2
(45) Date of Patent: Mar. 1, 2022

(54) POWER SUPPLY FOR GATE DRIVER IN SWITCHED-CAPACITOR CIRCUIT

(71) Applicant: pSemi Corporation, San Diego, CA (US)

(72) Inventors: David Giuliano, Bedford, NH (US); Gregory Szczeszynski, Hollis, NH (US); Raymond Barrett, Jr., Merrimack, NH (US)

(73) Assignee: pSemi Corporation, San Diego, CA (US)

( * ) Notice: Subject to any disclaimer, the term of this patent is extended or adjusted under 35 U.S.C. 154(b) by 0 days.

(21) Appl. No.: 16/840,188

(22) Filed: Apr. 3, 2020

(65) Prior Publication Data
US 2021/0028696 A1    Jan. 28, 2021

Related U.S. Application Data

(63) Continuation of application No. 16/385,320, filed on Apr. 16, 2019, now Pat. No. 10,644,590, which is a
(Continued)

(51) Int. Cl.
*H02M 3/07* (2006.01)
*H02M 1/088* (2006.01)

(52) U.S. Cl.
CPC ............. *H02M 3/07* (2013.01); *H02M 1/088* (2013.01); *H02M 3/073* (2013.01)

(58) Field of Classification Search
CPC ......... H02M 1/088; H02M 3/07; H02M 3/073
See application file for complete search history.

(56) References Cited

U.S. PATENT DOCUMENTS 6,476,666 B1    11/2002   Palusa
7,595,683 B1 *   9/2009   Floyd ................... H02M 3/073
                                               327/536
(Continued)

FOREIGN PATENT DOCUMENTS

CN   101997406 A   3/2011
CN   105393445 B   3/2016
(Continued)

OTHER PUBLICATIONS

Filing Receipt issued Oct. 23, 2018, U.S. Appl. No. 16/146,086, 3 pgs.
(Continued)

*Primary Examiner* — Kyle J Moody
*Assistant Examiner* — Lakaisha Jackson
(74) *Attorney, Agent, or Firm* — Finnegan, Henderson, Farabow, Garrett & Dunner, LLP

(57) ABSTRACT

An apparatus includes first and second pluralities of switches, a controller for controlling these switches, gate-drivers for driving switches from the first plurality of switches, and first and second terminals configured for coupling to corresponding first and second external circuits at corresponding first and second voltages. During operation, the controller causes the first plurality of switches to transition between states. These transitions result in the second voltage being maintained at a value that is a multiple of the first voltage. The controller also causes the second plurality of switches to transition between states. These transitions resulting in capacitors being coupled or decoupled from the second voltage. The gate drivers derive, from the capacitors, charge for causing a voltage that enables switches from the first plurality of switches to be driven.

20 Claims, 10 Drawing Sheets

Related U.S. Application Data continuation of application No. 15/813,505, filed on Nov. 15, 2017, now Pat. No. 10,263,512, which is a continuation of application No. 15/272,935, filed on Sep. 22, 2016, now Pat. No. 9,847,715, which is a continuation of application No. 14/276,426, filed on May 13, 2014, now Pat. No. 9,502,968, which is a continuation of application No. 13/837,796, filed on Mar. 15, 2013, now Pat. No. 8,724,353.

(56) References Cited

U.S. PATENT DOCUMENTS

| | | | | |
|---|---|---|---|---|
| 8,339,184 | B2 * | 12/2012 | Kok | H03K 17/687 |
| | | | | 327/536 |
| 8,619,445 | B1 * | 12/2013 | Low | H02M 3/073 |
| | | | | 363/59 |
| 8,724,353 | B1 | 5/2014 | Giuliano et al. | |
| 8,817,501 | B1 * | 8/2014 | Low | H02M 3/073 |
| | | | | 363/60 |
| 8,981,836 | B2 * | 3/2015 | Kern | H02M 3/073 |
| | | | | 327/536 |
| 9,502,968 | B2 | 11/2016 | Giuliano et al. | |
| 9,847,715 | B2 | 12/2017 | Giuliano et al. | |
| 10,263,512 | B2 | 4/2019 | Giuliano et al. | |
| 10,374,512 | B2 | 8/2019 | Szczeszynski et al. | |
| 10,644,590 | B2 | 5/2020 | Giuliano et al. | |
| 2009/0072800 | A1 * | 3/2009 | Ramadass | H02M 3/1584 |
| | | | | 323/271 |
| 2010/0117719 | A1 * | 5/2010 | Matano | H02M 3/073 |
| | | | | 327/536 |
| 2014/0091773 | A1 * | 4/2014 | Burlingame | H02M 3/07 |
| | | | | 323/271 |
| 2014/0327479 | A1 | 11/2014 | Giuliano | |
| 2017/0170725 | A1 | 6/2017 | Giuliano | |
| 2018/0159427 | A1 | 6/2018 | Giuliano | |
| 2019/0036450 | A1 | 1/2019 | Szczeszynski | |
| 2019/0245436 | A1 | 8/2019 | Giuliano | |

FOREIGN PATENT DOCUMENTS

| | | |
|---|---|---|
| CN | 201480028501 B | 3/2016 |
| CN | 110581646 A | 12/2019 |
| DE | 112014001448 T5 | 1/2016 |
| GB | 2527447 A | 12/2015 |
| GB | 2587296 | 3/2021 |
| KR | 20100138146 A | 12/2010 |
| KR | 20150131338 | 11/2015 |
| TW | 201444252 | 11/2014 |
| WO | 2014150354 A1 | 9/2014 |

OTHER PUBLICATIONS

Notice of Publication dated Jan. 31, 2019, U.S. Appl. No. 16/146,086, 1 pg.
Notice of Allowance dated Mar. 28, 2019, U.S. Appl. No. 16/146,086, 8 pgs.
Informational Notice to Applicant dated Oct. 23, 2018, U.S. Appl. No. 16/146,086, 1 pg.
Response to Informational Notice to Applicant filed Apr. 26, 2019, U.S. Appl. No. 16/146,086, 11 pgs.
Notice of Acceptance of Power of Attorney, issued May 1, 2019, U.S. Appl. No. 16/146,086, 1 pg.
Notice Requiring Inventor's Oath or Declaration dated May 6, 2019, U.S. Appl. No. 16/146,086, 1 pg.
Resubmission of Substitute Declaration filed May 23, 2019, U.S. Appl. No. 16/146,086, 4 pgs.
Issue Fee Payment filed Jun. 24, 2019, U.S. Appl. No. 16/146,086, 6 pgs.
Issue Notification dated Jul. 17, 2019, U.S. Appl. No. 16/146,086, 1 pg.
Filing Receipt mailed May 2, 2013, U.S. Appl. No. 13/837,796, 3 pgs.
Decision Granting Request for Prioritized Examination dated May 6, 2013, U.S. Appl. No. 13/837,736, 1 pg.
Non-Final Office Action dated Sep. 9, 2013, U.S. Appl. No. 13/837,736, 8 pgs.
Response to Non-Final Office Action dated Dec. 9, 2013, U.S. Appl. No. 13/837,736, 15 pgs.
Notice of Allowance dated Dec. 26, 2013, U.S. Appl. No. 13/837,736, 17 pgs.
Issue Fee Payment as Filed Mar. 26, 2014, U.S. Appl. No. 13/837,736, 6 pgs.
Issue Notification dated Apr. 23, 2014, U.S. Appl. No. 13/837,736, 1 pgs.
Notification of Loss of Entitlement to Small Entity Status Under 37 CFR 1.27 (g)(2) dated Jun. 5, 2017, U.S. Appl. No. 13/837,736, 1 pgs.
Acknowledgement of Loss of Entitlement to Entity Status Discount dated Oct. 6, 2017, U.S. Appl. No. 13/837,736, 1 pgs.
Filing Receipt mailed May 28, 2014, U.S. Appl. No. 14/276,426, 3 pgs.
Notice to File Missing Parts of NonProvisional Application dated May 28, 2014, U.S. Appl. No. 14/276,426, 2 pgs.
Response to Notice to File Missing Parts of NonProvisional Application and Preliminary Amendment filed Jul. 24, 2014, U.S. Appl. No. 14/276,426, 16 pgs.
Updated Filing Receipt and Notice of Acceptance of Power of Attorney dated Jul. 30, 2014, U.S. Appl. No. 14/276,426, 4 pgs.
Preliminary Amendment and Request for Participation in PPH Pilot Program filed Sep. 30, 2014, U.S. Appl. No. 14/276,426, 9 pgs.
Notice of Publication dated Nov. 5, 2014, U.S. Appl. No. 14/276,426, 1 pg.
Patent Prosecution Highway decision on request/petition to make special mailed Mar. 17, 2015, U.S. Appl. No. 14/276,426, 2 pgs.
Non-Final Office Action dated Apr. 23, 2015, U.S. Appl. No. 14/276,426, 20 pgs.
Response to Non-Final Office Action filed Jul. 23, 2015, U.S. Appl. No. 14/276,426, 19 pgs.
Final Office Action dated Sep. 29, 2015, U.S. Appl. No. 14/276,426, 18 pgs.
Response to Final Office Action and AFCP Request filed Nov. 30, 2015, U.S. Appl. No. 14/276,426, 17 pgs.
Advisory Action and AFCP Decision dated Jan. 14, 2016, U.S. Appl. No. 14/276,426, 6 pgs.
Notice of Appeal filed Jan. 29, 2016, U.S. Appl. No. 14/276,426, 11 pgs.
Pre-Brief Appeal Conference decision mailed Apr. 20, 2016, U.S. Appl. No. 14/276,426, 2 pgs.
Request for Continued Examination and Amendment filed May 20, 2016, U.S. Appl. No. 14/276,426, 20 pgs.
Notice of Allowance dated Jun. 22, 2016, U.S. Appl. No. 14/276,426, 18 pgs.
Request for Corrected Filing Receipt filed Sep. 20, 2016, U.S. Appl. No. 14/276,426, 8 pgs.
Issue Fee Payment and Rule 312 Amendment filed Sep. 22, 2016, U.S. Appl. No. 14/276,426, 17 pgs.
Corrected Filing Receipt dated Sep. 22, 2016, U.S. Appl. No. 14/276,426, 3 pgs.
Supplemental Notice of Allowability dated Oct. 20, 2016, U.S. Appl. No. 14/276,426, 5 pgs.
Issue Notification dated Nov. 2, 2016, U.S. Appl. No. 14/276,426, 1 pg.
Acknowledgement of Loss of Entitlement to Entity Status Discount issued Oct. 6, 2017, U.S. Appl. No. 14/276,426, 1 pg.
Filing Receipt and Notice to File Missing Parts dated Oct. 5, 2016, U.S. Appl. No. 15/272,935, 6 pgs.
Preliminary Amenedment and Response to Notice to File Missing Parts filed Mar. 6, 2017, U.S. Appl. No. 15/272,935, 66 pgs.
Notice of Publication dated Jun. 15, 2017, U.S. Appl. No. 15/272,935, 1 pg.
Non-Final Office Action dated Jul. 3, 2017, U.S. Appl. No. 15/272,935, 22 pgs.

(56) References Cited

OTHER PUBLICATIONS

Response to Non-Final Office Action and Terminal Disclaimer filed Oct. 2, 2017, U.S. Appl. No. 15/272,935, 16 pgs.
Notification of loss of entitlement to small entity status dated Oct. 2, 2017, U.S. Appl. No. 15/272,935, 1 pg.
Request for Corrected Filing Receipt filed Oct. 4, 2017, U.S. Appl. No. 15/272,935, 6 pgs.
Terminal Disclaimer review decision issued Oct. 3, 2017, U.S. Appl. No. 15/272,935, 18 pgs.
Notice of Acceptance of Power of Attorney and Corrected Filing Receipt dated Oct. 6, 2017, U.S. Appl. No. 15/272,935, 4 pgs.
Notice of Allowance dated Oct. 19, 2017, U.S. Appl. No. 15/272,935, 17 pgs.
Issue Fee Payment filed Nov. 14, 2017, U.S. Appl. No. 15/272,935, 6 pgs.
Issue Notification dated Nov. 29, 2017, U.S. Appl. No. 15/272,935, 1 pg.
Filing Receipt and Notice to File Missing Parts dated Dec. 4, 2017, U.S. Appl. No. 15/813,505, 6 pgs.
Response to Notice to File Missing Parts filed Feb. 5, 2018, U.S. Appl. No. 15/813,505, 6 pgs.
Request for Corrected Filing Receipt filed Feb. 23, 2018, U.S. Appl. No. 15/813,505, 12 pgs.
Updated Filing Receipt and Notice of Acceptance of Power of Attorney dated Feb. 28, 2018, U.S. Appl. No. 15/813,505, 5 pgs.
Non-Final Office Action dated Apr. 5, 2018, U.S. Appl. No. 15/813,505, 15 pgs.
Notice of Publication dated Jun. 6, 2018, U.S. Appl. No. 15/813,505, 1 pg.
Response to Non-Final Office Action filed Jun. 25, 2018, U.S. Appl. No. 15/813,505, 9 pgs.
Request for Corrected Filing Receipt filed Oct. 19, 2018, U.S. Appl. No. 15/813,505, 13 pgs.
Notice of Allowance dated Oct. 29, 2018, U.S. Appl. No. 15/813,505, 18 pgs.
Corrected Filing Receipt dated Nov. 29, 2018, U.S. Appl. No. 15/813,505, 3 pgs.
Supplemental Notice of Allowability dated Jan. 24, 2019, U.S. Appl. No. 15/813,505, 5 pgs.
Issue Fee Payment and Rule 312 Amendment filed Jan. 29, 2019, U.S. Appl. No. 15/813,505, 13 pgs.
Supplemental Notice of Allowability and Response to Rule 312 Amendment dated Mar. 8, 2019, U.S. Appl. No. 15/813,505, 7 pgs.
Issue Notification dated Mar. 27, 2019, U.S. Appl. No. 15/813,505, 1 pg.
Wai-Shan Ng, et. al., "Switched Capacitor DC-DC Converter: Superior where the Buck Converter has Dominated", Electrical Engineering and Computer Sciences University of California at Berkeley, Technical Report No. UCB/EECS-2011-94, http://www.eecs.berkeley.edu/Pubs/TechRpts/2011/EECS-2011-94.html, Aug. 17, 2011, 141 pgs.
Filing Receipt dated Apr. 30, 2019, U.S. Appl. No. 16/385,320, 5 pgs.
Notice of Publication dated Aug. 8, 2019, U.S. Appl. No. 16/385,320, 1 pg.
Notice of Allowance dated Jan. 2, 2020, U.S. Appl. No. 16/385,320, 24 pgs.
Power of Attorney filed Mar. 19, 2020, U.S. Appl. No. 16/385,320, 6 pgs.
Notice of Acceptance of Power of Attorney dated Mar. 24, 2020, U.S. Appl. No. 16/385,320, 1 pg.
Issue Fee Payment and Rule 312 Amendment filed Apr. 2, 2020, U.S. Appl. No. 16/385,320, 8 pgs.
Issue Notification dated Apr. 15, 2020, U.S. Appl. No. 16/385,320, 1 pg.
International Search Report dated Jul. 17, 2014, International Patent Application No. PCT/US2014/023025, 3 pgs.
Written Opinion of the International Searching Authority dated Jul. 17, 2014, International Patent Application No. PCT/US2014/023025, 5 pgs.

International Preliminary Report on Patentability dated Sep. 15, 2015, International Patent Application No. PCT/US2014/023025, 6 pgs.
First Office Action dated Jun. 2, 2017, Chinese Patent Application No. 201480028501.9, 7 pgs.
Claims as Amended and response as filed to the First Office Action Nov. 17, 2017, Chinese Patent Application No. 201480028501.9, 31 pgs.
Second Office Action dated Mar. 15, 2018, Chinese Patent Application No. 201480028501.9, 8 pgs.
Claims as Amended and response as filed to the Second Office Action May 30, 2018, Chinese Patent Application No. 201480028501.9, 37 pgs.
Third Office Action dated Sep. 20, 2018, Chinese Patent Application No. 201480028501.9, 8 pgs.
Claims as Amended and response as filed to the Third Office Action Dec. 3, 2018, Chinese Patent Application No. 201480028501.9, 37 pgs.
Claims as Amended and filed in response to the Examiner's Telephonic Message May 9, 2019, Chinese Patent Application No. 201480028501.9, 14 pgs.
Notification of Grant dated May 29, 2019, Chinese Patent Application No. 201480028501.9, 4 pgs.
Examination Report under Section 18(3) dated Mar. 16, 2020, Great Britain Patent Application No. GB1516828.9, 5 pgs.
Examiner Initialed 1449s/SB08 for U.S. Appl. No. 13/837,796 considered Dec. 11, 2013, 5 pgs.
Examiner Initialed 1449s/SB08 for U.S. Appl. No. 14/276,426 considered Apr. 17, 2015, 8 pgs.
Examiner Initialed 1449s/SB08 for U.S. Appl. No. 15/272,935 considered May 30, 2017, 6 pgs.
Examiner Initialed 1449s/SB08 for U.S. Appl. No. 15/813,505 considered Mar. 31, 2018, 6 pgs.
Examiner Initialed 1449s/SB08 for U.S. Appl. No. 16/385,320 considered Dec. 22, 2019, 6 pgs.
U.S. Appl. No. 13/837,796/400.P007-Patent Application filed Mar. 15, 2013, 44 pages, Doc 8078.
U.S. Appl. No. 14/276,426/400.P007C—Patent Application filed May 13, 2014, 42 pages, Doc 8079.
U.S. Appl. No. 15/813,505/400.P007C3—Patent Application filed Nov. 15, 2017, 39 pages, Doc 8080.
CN201480028501/400.P007PCTCN—CN Patent Application dated Nov. 16, 2015, 23 pages, Doc 8081.
CN201480028501/400.P007PCTCN—Patent Certificate dated Sep. 10, 2019, 4 pages, Doc 8077.
CN201910745987/400.P007PCTCND—CN Patent Application filed Aug. 13, 2019, 49 pages, Doc 8074.
CN201910745987/400.P007PCTCND—First Office Action dated Dec. 2, 2020, 5 pages, Doc 8075.
CN201910745987/400.P007PCTCND—Response to First Office Action dated Apr. 19, 2021, 16, pages, Doc 8076.
GB1516828/400.P007PCTGB—GB Patent Application filed Sep. 23, 2015, 23 pages, Doc 8082.
GB1516828/400.P007PCTGB—Warning of Refusal Under Section 20(1) dated Feb. 20, 2021, 5 pages, Doc 8083.
GB2019790/400.P007PCTGBD—GB Patent Application dated Dec. 15, 2020, 34 pages, Doc 8084.
GB2019790/400.P007PCTGBD—Examination Report dated Jan. 7, 2021, 3 pages, Doc 8085.
GB2019790/400.P007PCTGBD—Response to Examination Report filed Apr. 7, 2021, 7 pages, Doc 8086.
GB2105376/400.P007PCTGBD2—GB Patent Application filed Apr. 15, 2021, 35 pages, Doc 8087.
GB2105376/400.P007PCTGBD2—Examination Report Under Section 18(3) dated Apr. 27, 2021, 2 pages, Doc 8089.
GB2105376/400.P007PCTGBD2—Response to Examination Report Under Section 18(3) filed Jun. 8, 2021, 4 pages, Doc 8090.
GB2105376/400.P007PCTGBD2—Examiner Letter dated Jun. 21, 2021, Doc 8088.
DE112014001448/400.P007PCTDE—DE Patent Application filed Sep. 15, 2015, 36 pages, Doc 8091.
DE112014001448/1400.P007PCTDE—Request for Examination and Preliminary Amendment filed Mar. 22, 2021, 8 pages, Doc 8092.

(56) References Cited

OTHER PUBLICATIONS

KR20157029810/400.P007PCTKR—KR Patent Application filed Oct. 15, 2015, pages, Doc 8093.
TW103109646/400.P007TW—TW Patent Application filed Mar. 14, 2014, 33 pages, Doc 8096.
U.S. Appl. No. 16/146,086/400.P040X—Patent Application filed Sep. 28, 2018, 73 pages, Doc 8097.

* cited by examiner

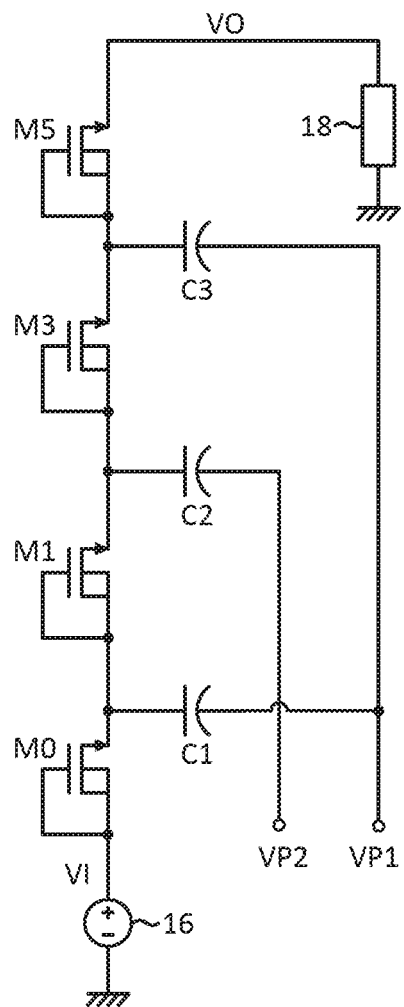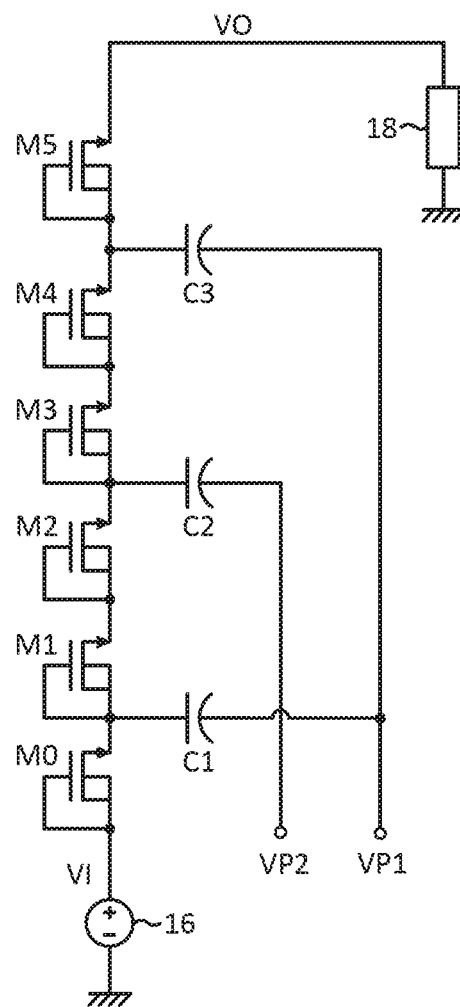
*FIG. 1*  *FIG. 2*

POWER SUPPLY FOR GATE DRIVER IN SWITCHED-CAPACITOR CIRCUIT

CROSS REFERENCE TO RELATED APPLICATIONS

This application is a continuation of U.S. application Ser. No. 15/813,505, filed on Nov. 15, 2017, now U.S. Pat. No. 10,263,512, issued on Apr. 16, 2019, which is a continuation of U.S. application Ser. No. 15/272,935, filed on Sep. 22, 2016, now U.S. Pat. No. 9,847,715, issued on Dec. 19, 2017, which is a continuation of U.S. application Ser. No. 14/276,426, filed on May 13, 2014, now U.S. Pat. No. 9,502,968, issued on Nov. 22, 2016, which is a continuation of U.S. application Ser. No. 13/837,796, filed on Mar. 15, 2013, now U.S. Pat. No. 8,724,353, issued on May 13, 2014 the contents of which are hereby incorporated by reference in their entirety.

FIELD OF DISCLOSURE

This invention relates to switched capacitor converters, and more particularly to efficient gate drivers for such converters.

BACKGROUND

A switch-mode power converter produces an output voltage by switching reactive elements into different topologies using a switching network. In those cases in which the reactive elements are capacitors, the resulting power converter is referred to as a switched-capacitor power converter. In a typical switched-capacitor converter, the number of capacitors and switches increases as the conversion gain increases.

The switches in such converters must be driven to open and close at opportune times. In those cases in which the switch is implemented as a MOSFET, driving a switch requires causing charge to flow into a gate terminal so as to cause an electric field. In an enhancement mode MOSFET, this electric field causes an inversion layer that permits charge to flow between source and drain.

A circuit that causes charge to flow into a transistor's gate terminal is often called a "gate driver." The charge that enters the gate driver obviously has to come from somewhere. For this reason, a gate driver requires a power supply.

As used herein, conversion gain represents a voltage gain if the switched capacitor power converter produces an output voltage that is larger than the input voltage or a current gain if the switched capacitor power converter produces an output voltage that is smaller than the input voltage.

SUMMARY

In one aspect, the invention features an apparatus that includes first and second pluralities of switches, a controller for controlling these switches, gate-drivers for driving switches from the first plurality of switches, and first and second terminals configured for coupling to corresponding first and second external circuits at corresponding first and second voltages. During operation, the controller causes the first plurality of switches to transition between successive states, each state being characterized by a switch-activation pattern that defines which switches are to be open and which switches are to be closed during the state. These transitions result in the second voltage being maintained at a value that is a multiple of the first voltage. The controller also causes the second plurality of switches to transition between successive states, each state being characterized by a switch-activation pattern that defines which switches are to be open and which switches are to be closed during the state. These transitions resulting in capacitors being coupled or decoupled from the second voltage. The gate drivers derive, from the capacitors, charge for causing a voltage that enables switches from the first plurality of switches to be driven.

In some embodiments, each switch in the first plurality of switches has a maximum voltage rating that is less than whichever of the first and second voltages is greater.

In other embodiments, a first gate-driver from the gate drivers comprises first and second power connections. In such embodiments, a voltage difference between the first and second power connections is less than or equal to twice the lower of the first and second voltages.

Also among the embodiments are those in which a first gate-driver from the gate drivers comprises a first power-connection and a second power-connection. In these embodiments, the first power connection is coupled to one of the capacitors such that a voltage difference between the first and second power connections is less than whichever of the first and second voltages has a higher magnitude.

In yet other embodiments, the switches in the second plurality of switches are implemented by transistors, each of which has a gate voltage and a source voltage. In such embodiments, the apparatus also has a resistor divider that is coupled to the second plurality of switches.

Further embodiments includes those in which a resistor divider couples to the second plurality of switches, with the switches being implemented by transistors, each of which has a gate voltage and a source voltage. In such cases, the resistor divider causes a source voltage of each of the transistors to be at least a threshold voltage below a corresponding gate voltage of the transistor.

Other embodiments include those in which the controller is configured to disable operation of the second plurality of switches after lapse of an interval.

In other embodiments, the switches in the second plurality of switches are implemented by transistors, each of which has a different gate voltage.

In another aspect, the invention features a first switch-set, a controller for controlling switches in the first switch-set, gate-drive circuitry for driving the switches, first and second terminals configured for coupling to corresponding first and second external circuits at corresponding first and second voltages, and nodes for coupling the gate-driving circuitry to a power supply. The power supply includes capacitors that are constituents of a switched-capacitor network that is coupled to the switches. During operation, the controller causes the switches in the first switch-set to transition between successive states, each state being characterized by a switch-activation pattern that defines which switches are to be open and which switches are to be closed during the state. These transitions cause the second voltage to be maintained at a value that is a multiple of the first voltage. The nodes that couple the gate-driving circuitry to the power supply will, in this case, couple them to the capacitors.

Among the embodiments are those in which the first switch-set comprises a first switch that lines along a path between anodes of first and second capacitors. In such embodiments, a voltage difference across the switch while the switch is open is less than a voltage difference between the anodes of the capacitors.

Also among the embodiments are those in which the capacitors comprise a first capacitor set and a second capacitor set. A second switch-set selectively couples the second terminal to capacitors in the first capacitor set while decoupling the second terminal from capacitors in the second capacitor set. Prior to starting steady-state operation of the power supply, the controller causes the switches in the second switch-set to allow the second voltage to drive charge toward the capacitors of the power supply.

Embodiments further include those in which the nodes couple the gate-drive circuitry to anodes of the capacitors.

Yet other embodiments include those in which, during steady-state operation of the power supply, the controller opens the second switches. This has the effect of preventing the second voltage from driving charge toward the capacitors of the power supply.

Also among the embodiments are those in which the capacitors of the power supply comprise a first capacitor-set and a second capacitor-set. The first set comprises a capacitor having a cathode thereof connected to a phase voltage and the second set comprises a capacitor having a cathode thereof connected to a phase-shifted version of the phase voltage.

Further embodiments include those in which the power supply comprises a cascade multiplier.

In still other embodiments, the capacitors comprise a first capacitor and a second capacitor and the gate-drive circuitry comprises first and second gate drives that drive corresponding first and second switches that are in series so that all current passing through the first switch also passes through the second switch. In these embodiments, the first switch connects to an anode of a first capacitor and the second switch connects to an anode of a second capacitor.

Further embodiments include those in which the capacitors comprise first and second capacitor sets and a second switch-set selectively couples the second terminal to capacitors in the first set while decoupling the second terminal from capacitors in the second set.

Other features and advantages of the invention are apparent from the following description, and from the claims.

BRIEF DESCRIPTION OF THE DRAWINGS

FIG. 1 is a schematic of a single-phase step-up cascade multiplier;

FIG. 2 is a schematic of a single-phase step-up cascade multiplier with cascoded switches;

DETAILED DESCRIPTION

Figure 3:
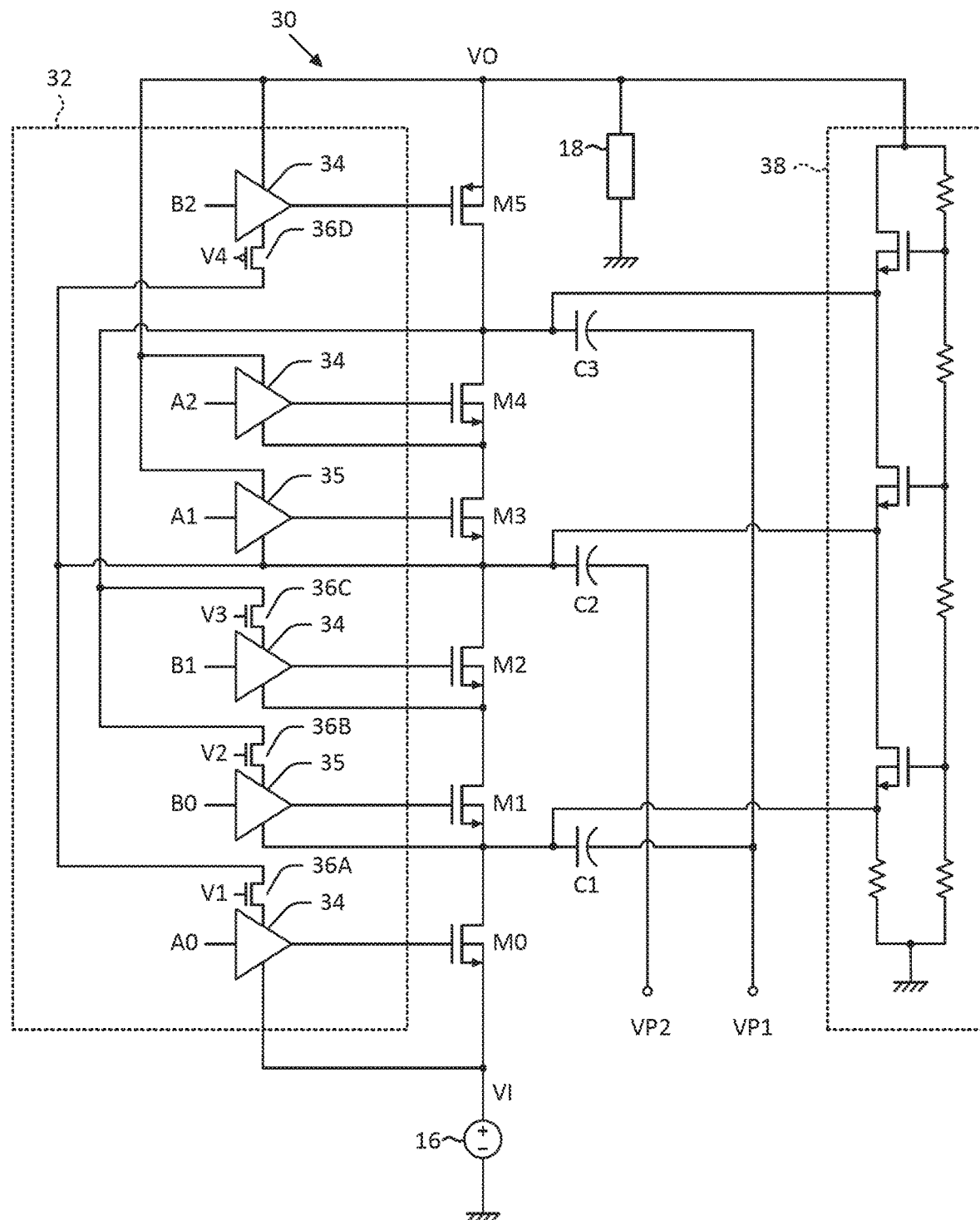
FIG. 3 is a schematic of a single-phase cascade multiplier with cascoded switches and corresponding gate drivers and pre-charging circuit.

FIGS. 1-2 show cascade multipliers that receive an input voltage VI from a voltage source 16 and provide an output voltage VO to a load 18. Consistent with conventional circuit representations, a capacitor's anode is shown as a straight line and its cathode is shown as a curved line.

Switches M0-M5 connect the anodes of the capacitors C1-C3 to some other element, which is either the anode of another capacitor or a first or second terminal of the cascade multiplier. The capacitors' cathodes connect to one of two phase voltages VP1, VP2, which are 180-degrees out-of-phase.

In FIG. 1, there is one switch M1 between anodes of two capacitors C1, C2. However, in FIG. 2, there are two switches M1, M2 between the anodes of the same two capacitors.

In normal operation, packets of charge are pumped along a chain of diode-connected NMOS transistors M0-M5 as pump capacitors C1-C3 are successively being charged and discharged. As shown in FIGS. 1-2, phase voltages VP1, VP2 are one hundred and eighty degrees out of phase.

Each of the NMOS transistors M0-M5 is diode-connected, thereby only permitting boost operation (i.e. VO greater than VI). Additionally, the efficiency is severely impacted because a significant amount of voltage is dropped across each of the transistors M0-M5 during normal operation. Therefore, there is a desire to operate the NMOS transistors M0-M5 in their ohmic region, but due difficulty and/or complexity of driving the transistors M0-M5, a combination of both PMOS transistors and high-voltage transistors are typically used.

If the transistors in the switched-capacitor power converter are integrated on a single substrate then it can be desirable to use as few different types of devices as possible. This is because the cost of fabrication increases as the number of mask layers increases. As the number of different types of devices in a semiconductor process increases so does the number of mask layers and hence the cost.

The switches define a power path from a source 16 to a load 18. It is useful to minimize the number of PMOS devices along the power path since hole mobility is somewhat less than electron mobility in silicon. As a result, PMOS devices tend to have higher on-resistance and higher gate capacitance that NMOS devices. It is also desirable to replace as many high-voltage devices with low-voltage devices.

A number of approaches are described below for use in the context of active control of switched capacitor power converters. The approaches address one or more of the following goals:

Increase in efficiency of the converter by reducing the charge deposited and discharged from the gates of control transistors Permitting use of low-voltage transistors for switching.

Generally, an approach to achieving these goals is by efficiently limiting the gate-to-source voltages though the design and powering of circuits driving the switching transistors during operation. A number of specific approaches, some of which are described below, use control circuitry for switching transistors, which couple the capacitors in the charge transfer path, that are themselves powered by capacitors in the same path, and/or by capacitors in different parallel paths in the case of multi-phase converters.

Referring to FIG. 3, a single-phase cascade multiplier circuit 30 makes use of transistors M0-M5 coupling to first, second, and third pump capacitors C1-C3 on the charge transfer path between a high-voltage terminal (i.e. VO) and a low-voltage terminal (i.e. VI). In the embodiment illustrated in FIG. 3, the pump capacitors C1-C3 are coupled by cascoded transistor switches (e.g., M1 and M2 in series), but it should be understood that single transistors could also be used while still achieving at least some of the advantages of the configuration shown.

Each transistor is driven by a corresponding gate driver circuit. As described in more detail below, at least some of the gate driving circuits are powered from the pump capacitors C1-C3 in the charge transfer path between the high-voltage terminal and the low-voltage terminal. The voltage across each of the pump capacitors C1-C3 is a fraction of the high voltage, thereby permitting efficient generation of gate driving signals that maintain desired limits on the gate-to-source voltages of the transistors.

A driver set 32 provides the gate signals to activate or de-activate each transistor in the cascade multiplier circuit 30. The driver set 32 includes four low-voltage gate driver circuits 34, two high-voltage gate driver circuits 35, and four voltage followers 36A-36D. Each gate driver circuit receives a driver signal with a label either beginning with an "A" or a "B." The driver signals A0, B0, B1, A1, A2, B2 control transistors M0, M1, M2, M3, M4, M5, respectively. Furthermore, the voltage followers 36A-36D receive corresponding bias voltages V1-V4, respectively. A control circuit (not shown in FIG. 3) generates the driver signals A0-B2 and the bias voltages V1-V4.

The low-voltage gate driver circuits 34 are coupled to the transistors M0, M2, M4, M5, whereas, the high-voltage gate driver circuits 35 are coupled to the transistors M1, M3. The high-voltage gate driver circuits 35 support twice the supply voltage of the low-voltage gate driver circuits 34. Each of the voltage followers 36A-36D receive a voltage from one of the pump capacitors C1-C3 and provides a constant voltage to their corresponding gate driver circuit (i.e. 34 or 35) that is equal to or lower in value. When the received voltage is equal to the provided voltage, the corresponding voltage follower (e.g. 36A) behaves like a switch. To achieve this behavior, the bias voltages V1-V3 are at least a threshold voltage above the corresponding source voltage while the bias voltage V4 is at least a threshold voltage below the corresponding source voltage. Furthermore, the voltage followers 36A-36D experience the same voltage stress as the transistors M0-M5 in the cascade multiplier circuit 30.

Also illustrated in FIG. 3 is an example of a pre-charge circuit 38 that is used to initialize the voltages on the pump capacitors C1-C3 prior to clocked operation of the cascade multiplier circuit 30. By pre-charging the pump capacitors C1-C3, the drain-to-source voltages across the transistors M0-M5 within the cascade multiplier circuit 30 can be maintained within required limits during startup, and further, the pre-charged pump capacitors C1-C3 can provide the needed power to the gate driving circuits immediately upon the start of clocked operation of the cascade multiplier circuit 30. Upon clocked operation, the pre-charge circuit 38 can be disabled.

To facilitate the use of low-voltage transistors throughout the whole power converter, the pre-charge circuit 38 uses a combination of low-voltage transistors and bias resistors. A resistor divider sets up the pre-charge voltage for each of the pump capacitors C1-C3 during startup, wherein the source voltage of each transistor within the pre-charge circuit 38 is at least a threshold voltage below its corresponding gate voltage. As a result, none of the transistors within either the pre-charge circuit 38 or the cascade multiplier circuit 30 are exposed to voltage stresses that can damage the devices during startup or clocked operation.

Figure 4:
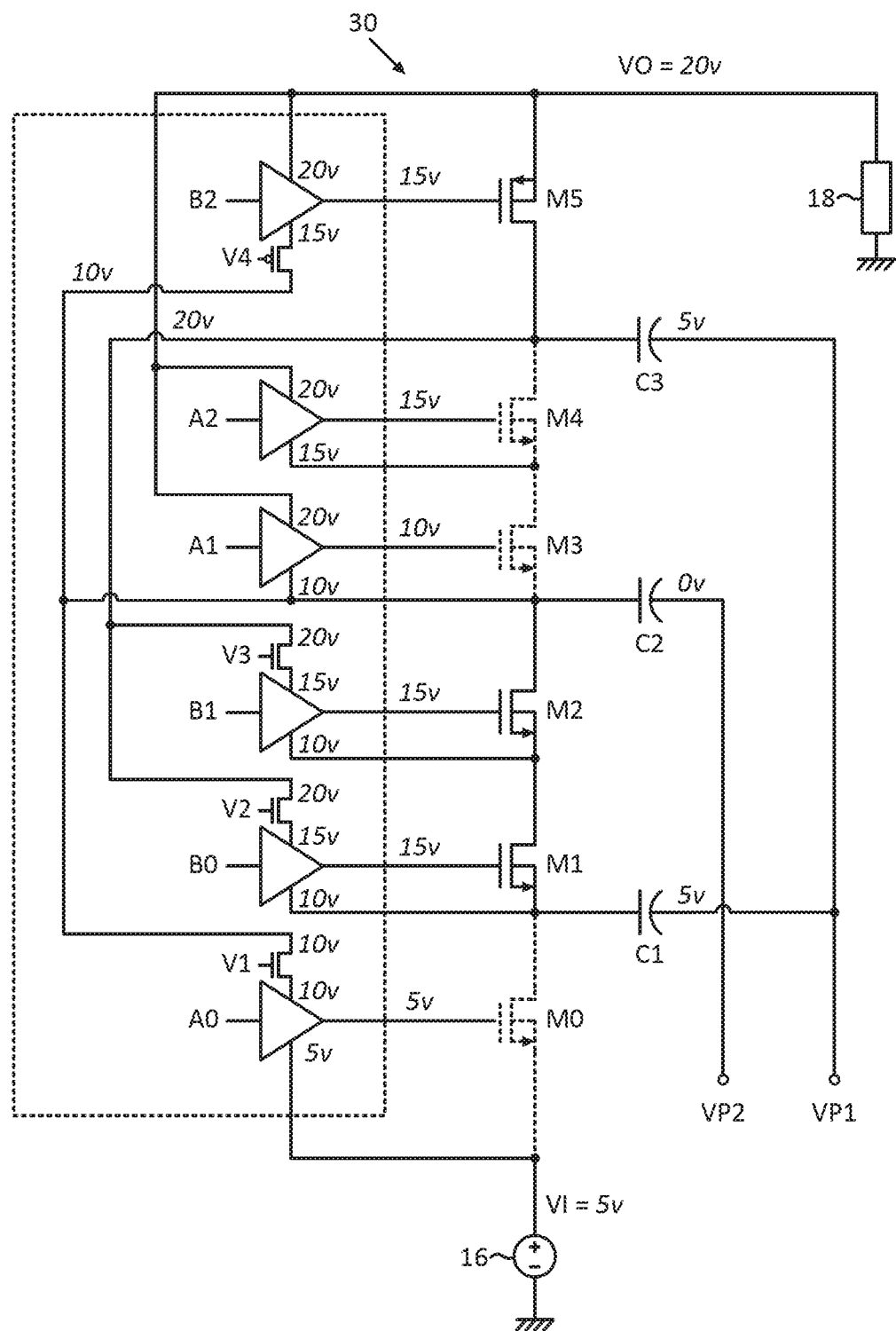
FIGS. 4-5 are annotated schematics of the circuit of FIG. 3 in two phases of operation, respectively.
Figure 5:
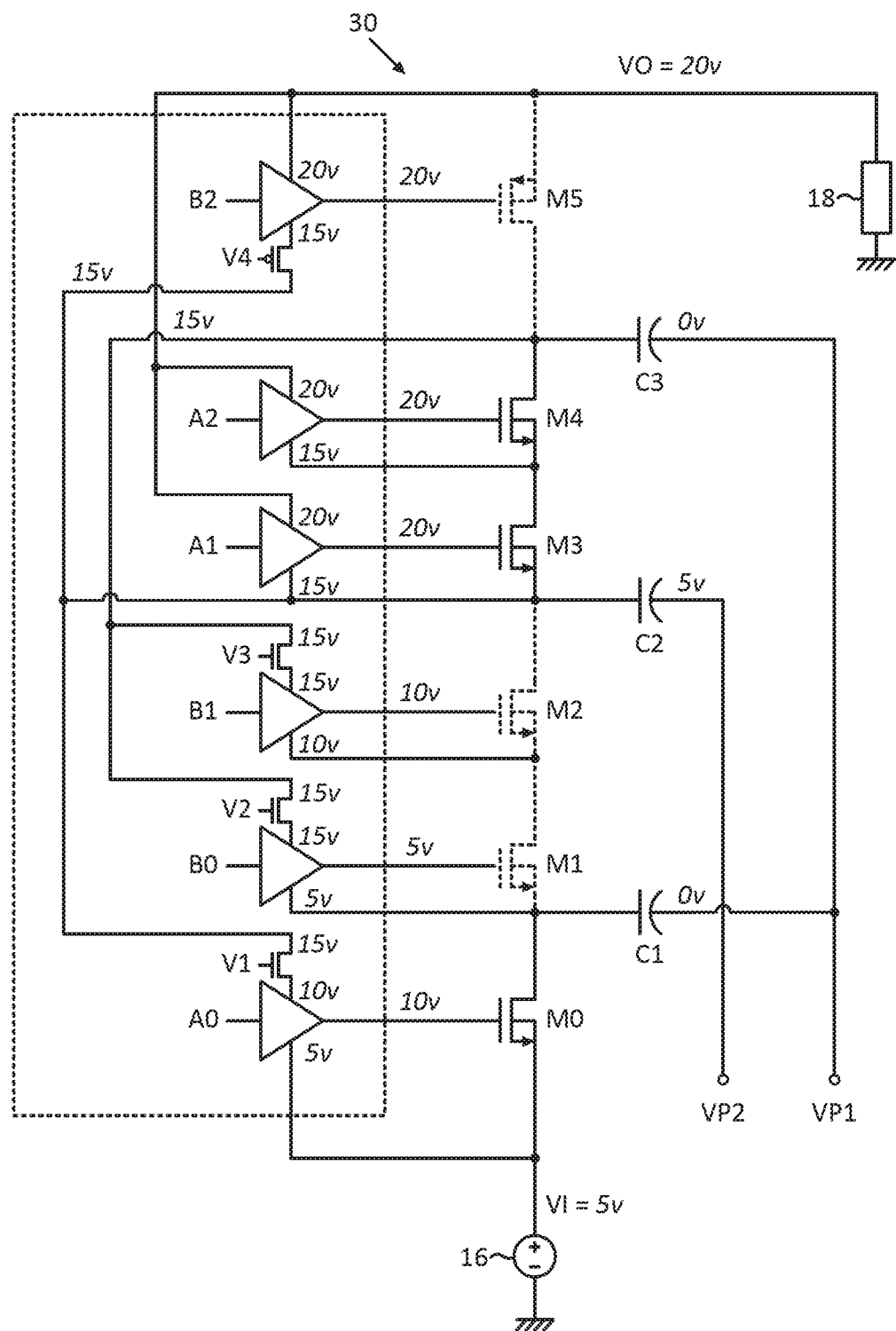

Operation of the cascade multiplier circuit 30 and the resulting voltage levels powering the gate driving circuits can be understood with reference to FIGS. 4-5 that show the two states of operation. The cascade multiplier circuit 30 transfers energy from a source 16 to a load 18 by cycling between a first state and a second state at a specific frequency. All of the transistors coupled with the "A" signals are activated and de-activated at the same time; as is the case for all of the transistors coupled with the "B" signals. To ensure a clean transition between the first and second state, the "A" signals and "B" signals are non-overlapping. Furthermore, first and second phase voltages VP1, VP2 are synchronized with the "A" signals and "B" signals.

Assuming an input voltage VI of five volts, then the cascade multiplier circuit 30 produces an output voltage VO that is twenty volts. The maximum voltage across any transistor is five volts. Furthermore, the low-voltage gate driver circuits 34 support five volts while the high-voltage gate driver circuits 35 must support ten volts.

FIG. 4 illustrates the first state, wherein the first phase voltage VP1 is at five volts while the second phase voltage VP2 is at zero volts. The gate driver circuits that receive a "B" signal activate their corresponding transistors and the gate driver circuits that receive an "A" signal de-activate their corresponding transistors. Consequently, a gate voltage of fifteen volts activates the transistors M1, M2, M5 while gate voltages of five volts, ten volts, and fifteen volts de-activate the transistors M0, M3, M4, respectively.

In contrast, FIG. 5 illustrates the second state, wherein the first phase voltage VP1 is at zero volts while the second phase voltage VP2 is at five volts. The gate driver circuits that receive an "A" signal activate their corresponding transistors and the gate driver circuits that receive a "B" signal de-activate their corresponding transistors. Consequently, gate voltages of five volts, ten volts, and twenty volts de-activate the transistors M1, M2, M5, respectively; while gate voltages of ten volts, twenty volts, and twenty volts activate the transistors M0, M3, M4, respectively.

Unfortunately, the voltage followers 36A-36D associated with the transistors M0, M1, M2, M5 consume power. Each voltage follower drops five volts across its drain and source terminals while sinking or source current for its corresponding gate driver. In the case of the transistors M1, M2, M5, this occurs during the first state while for transistor M0 this occurs during the second state.

In the cascade multiplier circuit 30, charge transfers to the load 18 from the source 16 at a rate dictated by the load 18. Because this is a single-phase design, there is only one charge transfer path that a unit of charge can follow. For example, at the start of a first clock cycle, the unit of charge leaves the source 16 and flows into the first pump capacitor C1. After a state transition, the unit of charge moves to the second pump capacitor C2. When a second clock cycle begins, the unit of charge then moves from the second pump capacitor C2 to the third pump capacitor C3 and after one more state transition, the unit of charge finally reaches the load 18. It took two full clock cycles (i.e. four consecutive states) for the initial charge to reach the load 18 from the source 16.

In general, as the conversion gain of a cascade multiplier increases, the number of pump capacitors increases. Consequently, it takes a longer time for a unit of charge from the source 16 to reach the load 18 because the unit of charge needs to bounce between more pump capacitors. The number of clock cycles in the charge transfer path is M-2, where M is equal to the conversion gain. In this example, M is equal to four; therefore, the number of clock cycles is two.

Figure 6:
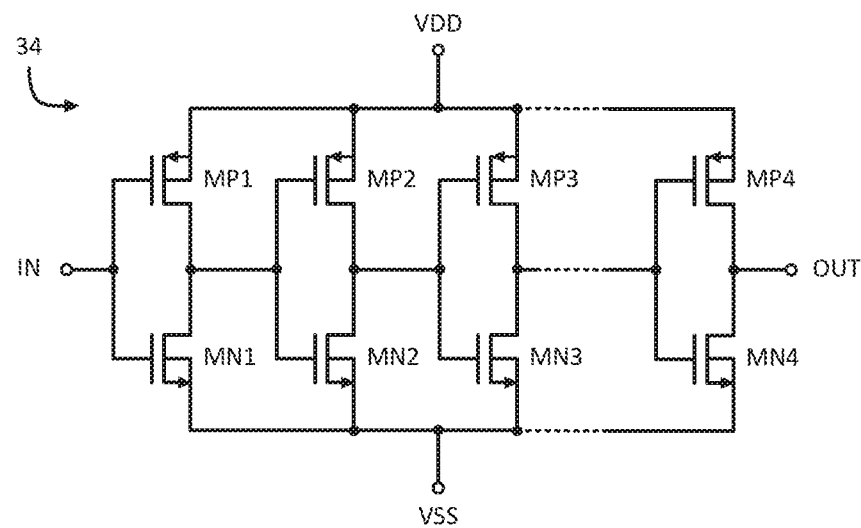
FIG. 6 is a schematic of a tapered gate driver.
Figure 7:
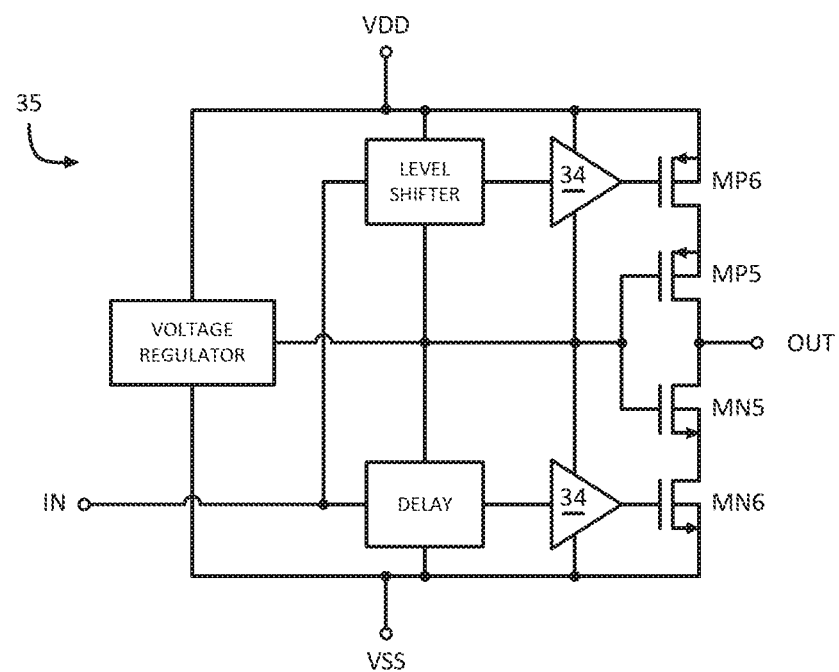
FIG. 7 is a schematic of a cascoded gate driver.

FIGS. 6-7 illustrate two alternative designs of the gate driving circuits. Both of which can be used for the high-voltage gate driver circuits 35 and the low-voltage gate driver circuits 34. However, as will be made clear in the following description, the gate driver in FIG. 6 is more suitable for the low-voltage gate driver 34 while the gate driver in FIG. 7 is more suitable for the high-voltage gate driver 35.

As illustrated in FIG. 6, a tapered gate driver features an input terminal IN, an output terminal OUT, and supply terminals VDD, VSS. The input terminal IN couples with the output terminal OUT through first, second, third, and fourth inverters, in that order. The four inverters include high-side PMOS transistors MP1-MP4 and low-side NMOS transistors MN1-MN4. Due to the difference in electron and hole mobilities, each of the PMOS transistors MP1-MP4 is typically sized larger than their corresponding NMOS transistors MN1-MN4.

Starting at the input terminal IN, each subsequent inverter is k times larger than the previous inverter. For example, if k is equal to five and the width of the first inverter is one micron, then the width of the second, third, and fourth inverters is five microns, twenty-five microns, and one hundred and twenty-five microns, respectively. By tapering the inverters, a small logic gate coupled to the input terminal IN is able to drive a large power transistor coupled to the output terminal OUT.

The maximum supply voltage of the tapered gate driver is equal to or less than the breakdown voltage of the transistors. Therefore, the tapered gate driver is a good choice for the low-voltage gate driver circuits 34 in the cascade multiplier circuit 30. Unfortunately, due to the higher voltage requirements of the high-voltage gate driver circuit 35 in FIGS. 3-5, the tapered gate driver circuit requires transistors with twice the breakdown voltage.

An alternative method of increasing the supply voltage without the need of higher voltage transistors is to use a cascoded gate driver. As illustrated in FIG. 7, a cascoded gate driver includes an input terminal IN, an output terminal OUT, and supply terminals VDD, VSS. The cascoded gate driver features an output stage that includes first and second high-side transistors MP5, MP6 and first and second low-side transistors MN5, MN6. The output stage requires additional support circuitry, such as a level shifter, two gate drivers, a delay block, and a voltage regulator, all of which can be designed using transistors with the same breakdown voltage as that of the transistors in the output stage.

During normal operation of the cascoded gate driver, the high-side transistors MP5, MP6 are activated when the low-side transistors MN5, MN6 are de-activated and vice-versa. Therefore, the cascoded gate driver can support twice the supply voltage because the differential voltage across the supply terminals VDD, VSS is always supported by two de-activated transistors. In general, a larger number of transistors can be cascoded to increase the supply voltage further. For example, if the output stage included three high-side transistors and three low-side transistors then the maximum supply voltage would be tripled and so on. Unfortunately, as the number of cascoded transistors increases, so does the complexity of the support circuitry.

Figure 8:
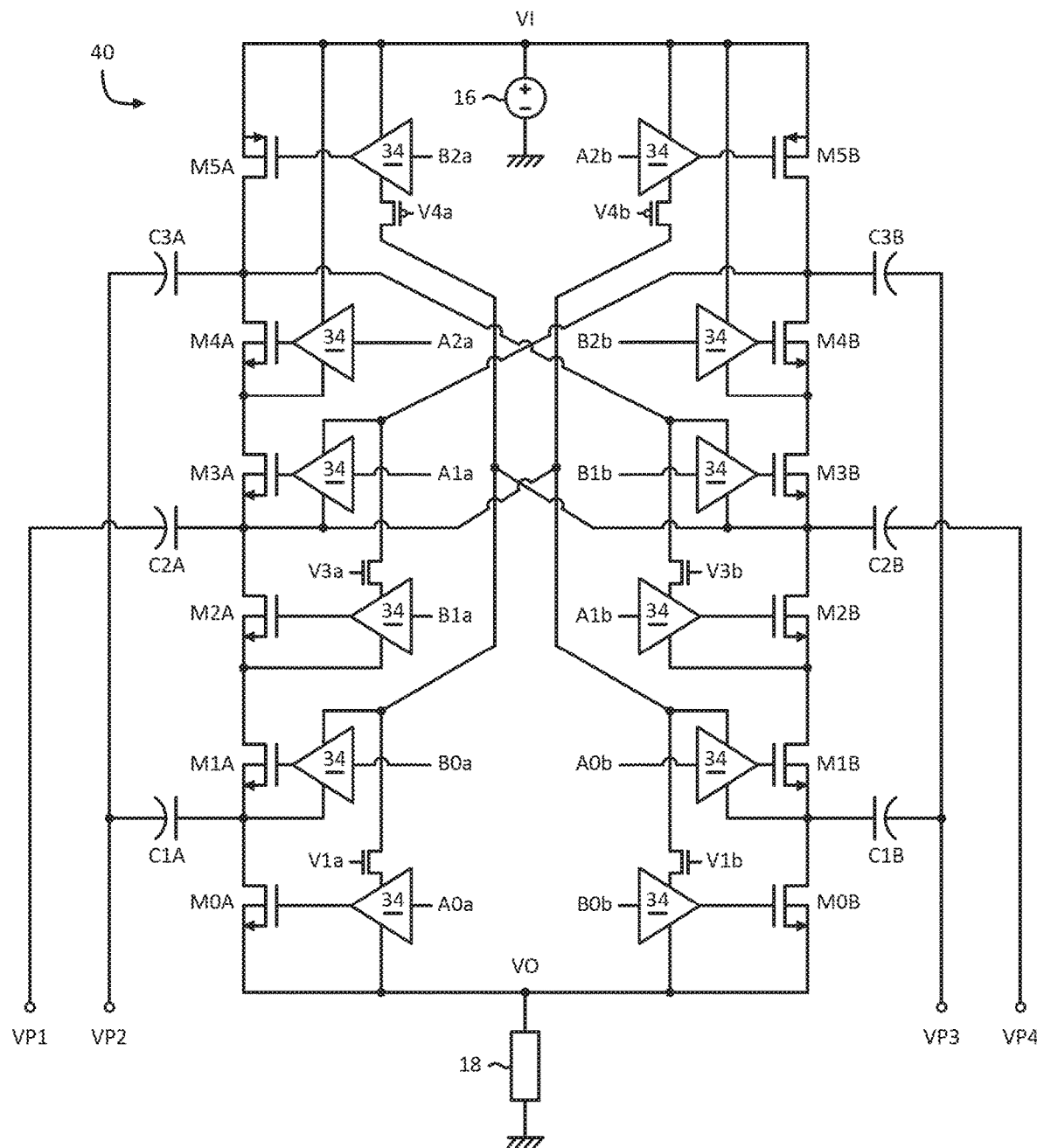
FIG. 8 is a schematic of a dual-phase cascade multiplier with cascoded switches and corresponding gate drivers.

In general, a single-phase cascade multiplier can be converted into a multi-phase cascade multiplier featuring multiple charge transfer paths that are shifted in time. As illustrated in FIG. 8, a dual-phase cascade multiplier circuit 40 can be constructed by placing two copies, of the single-phase cascade multiplier circuit 30 in parallel. Each copy is referred to as a phase (not to be confused with state), therefore, the cascade multiplier circuit 30 features a first phase and a second phase. The first phase includes capacitors C1A-C3A, transistors M0A-M5A, and phase voltages VP1, VP2 while the second phase includes capacitors C1B-C3B, transistors M0B-M5B, and phase voltages VP3, VP4. Each of the transistors M0A-M5B has a corresponding gate driver circuit 34 that receives a driver signal with a label either beginning with an "A" or a "B". The first phase includes driver signals A0a-B2a while the second phase includes driver signals A0b-B2b.

The control signals of the first phase and the second phase are shifted by one-hundred and eighty degrees. This can be achieved by swapping the "A" and "B" signals in one of the two phases and then inverting the corresponding phase voltages. For example, in normal operation, the phase voltages VP1, VP3 are high when the phase voltages VP2, VP4 are low and vice versa. Furthermore, the voltage followers in the first phase receive bias voltages V1a-V4a while the voltage followers in the second phase receive bias voltage V1b-V4b. As in the previous single-phase example, a control circuit (not shown in FIG. 8) can generate the drivers signals A0a-B2b and the bias voltages V1a-V4b.

Additionally, by having the source 16 and the load 18 trade places, a step-down power converter can be converted into a step-up converter and vice versa. Therefore, the cascade multiplier circuit 40 is step-down power converter instead of a step-up power converter as in FIG. 3.

There are several benefits of a dual-phase construction over a single-phase construction. The most obvious benefit is that there is always a charge transfer path between the source 16 and the load 18 regardless of the state of operation (first or second). A less obvious benefit is that the one phase can derive energy from an alternate phase to power circuitry and vice versa. Furthermore, this technique allows the cascade multiplier circuit 40 to only use low-voltage gate driver circuits 34.

Figure 9:
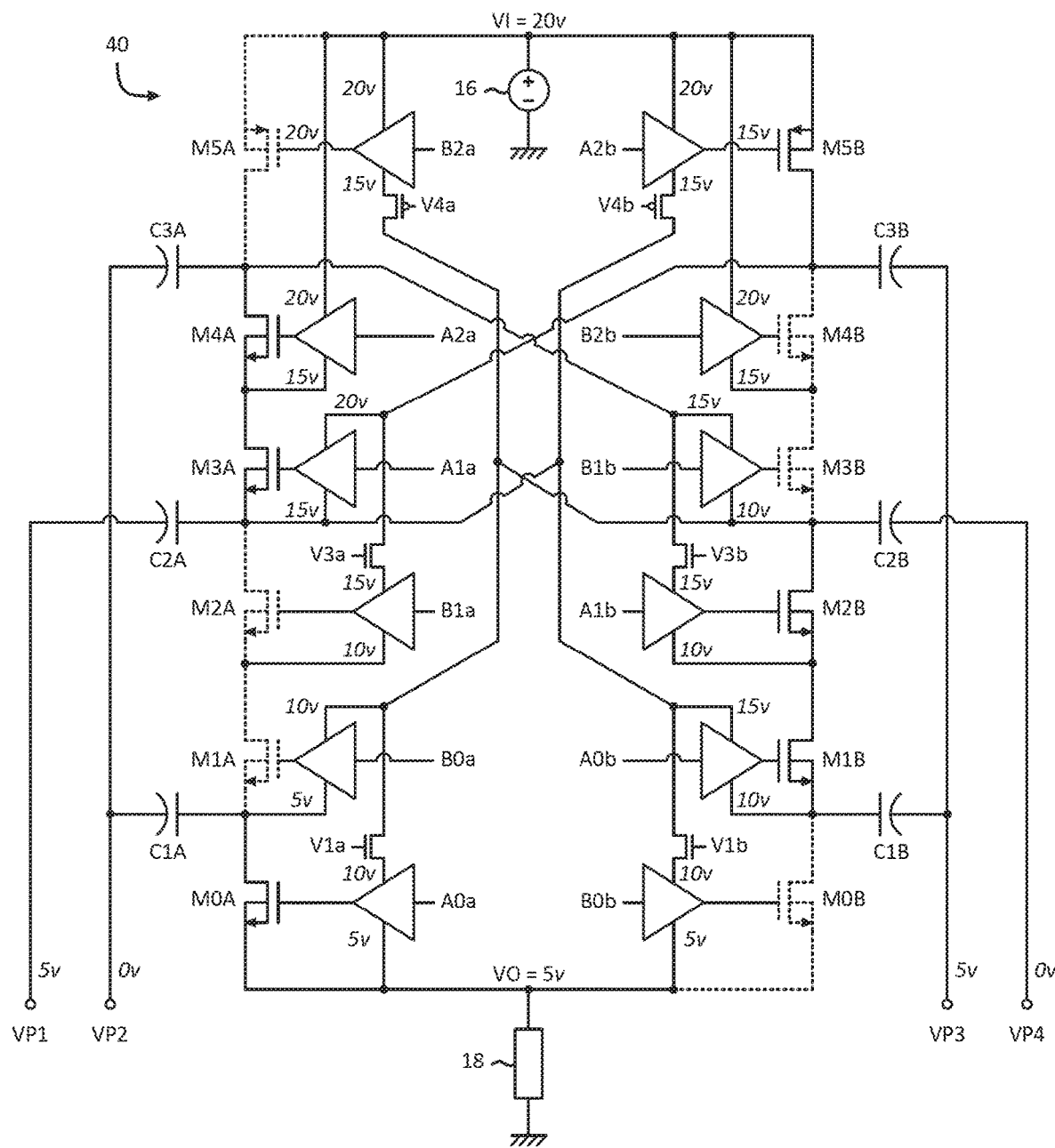
FIG. 9 is an annotated schematic of the circuit of FIG. 8 in one of two phases of operation.

Since a dual-phase converter is essentially two single-phase converters operated in parallel, the cascade multiplier circuit 40 operates as described in connection with FIGS. 3-5. Assuming the input voltage VI is twenty volts, the resulting voltage levels powering the gate driving circuits can be understood with reference to FIG. 9 that show one state of operation. The other state of operation is not shown because it is simply a mirror image of the state shown in FIG. 9.

In the cascade multiplier circuit 40, the transistors M0A-M3B derive power from opposing phases while the transistors M4A-M5B derive power from the input voltage VI. Powering the gate drivers from a parallel charge transfer path (i.e. opposing phase) results in one less voltage follower per phase and the voltage followers do not consume power. This is because the transistors M0A, M2A, M5A, M0B, M2B, M5B are de-activated while voltage is being dropped across their corresponding voltage followers. Because of the more efficient voltage followers and the lack of high-voltage gate driver circuits 35, the energy required to drive the gates in a dual-phase design is less than a single-phase design.

As in the single-phase construction of FIG. 3, it takes two full clock cycles for the initial charge into the cascade multiplier circuit 40 to reach the load 18. However, in the dual-phase construction, there are two charge transfer paths between the source 16 and the load 18, instead of one, as in the single-phase construction. Furthermore, the two distinct charge transfer paths are shifted in time with respect to each other.

For example, a first unit of charge from the source 16 enters a first charge transfer path at the input of the cascade multiplier circuit 40. During each state transition, the first unit of charge hops between the positive terminals of the capacitors C3B, C2B, C1B, in that order, thereby being delivered to the load 18 after four state transitions. Similarly, in a second charge transfer path, a second unit of charge leaves the source 16 and then precedes to hop between the positive terminals of the capacitors C3B, C2B, C1B each state transition. After the fourth state transition, the second unit of charge is delivered to the load 18. By shifting the first and second charge transfer paths one hundred and eighty out of phase, a path for charge always exists between the source 16 and the load 18.

Figure 10:
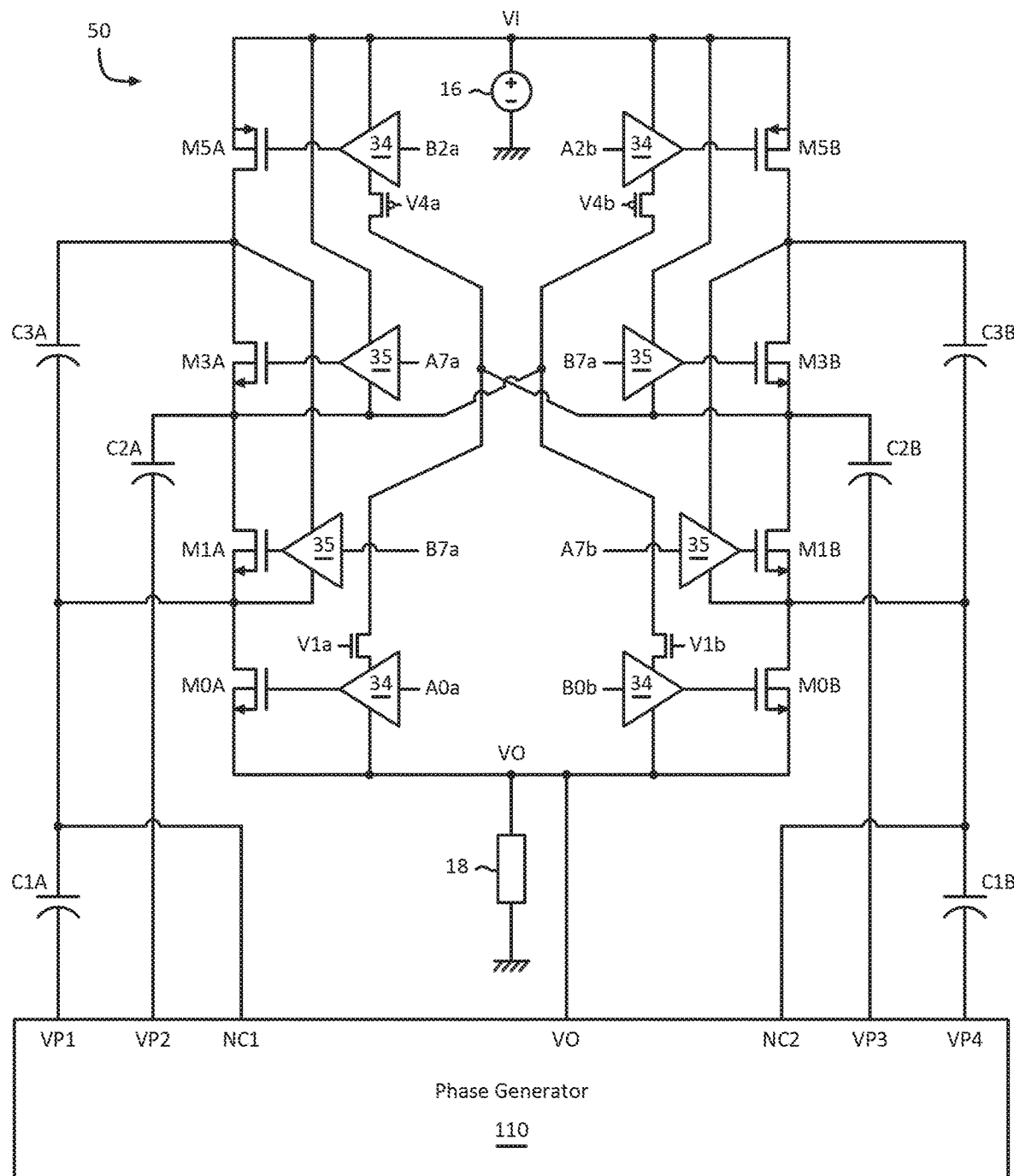
FIG. 10 is a schematic of a dual-phase cascade multiplier and corresponding gate drivers.

It should be appreciated that the above described dual-phase cascade multiplier circuit 40 is one of many different implementations. FIG. 10 illustrates an alternative dual-phase cascade multiplier circuit 50, formed by removing the cascode switches M2A, M4A, M2B, M4B in the cascade multiplier circuit 40, thereby reducing control complexity and perhaps improving robustness. Unfortunately, without the cascode switches, all of the inner switches M1A, M3A, M1B, M3B need to support twice the output voltage VO as well as their corresponding gate drivers 35.

Additionally, the pump capacitors C3A, C3B in the cascade multiplier circuit 50 are pumped in series with their corresponding pump capacitors C1A, C1B, compared to being pumped in parallel as in the cascade multiplier circuit 40. The series arrangement reduces the voltage across the pump capacitors C3A, C3B. For example, if the output voltage VO is five volts, then the voltage across the capacitors C3A, C3B is ten volts in FIG. 10 compared to fifteen volts in FIG. 8. Due to the similarity between the cascade multiplier circuits 40, 50, the cascade multiplier circuit 50 operates as described in connection with FIG. 10

In addition to efficient generation of gate driving signals, the capacitor voltages can also be used to efficiently drive the phase signals that drive the capacitors. Two examples of the phase generator 110 are shown in FIGS. 11-12, suitable to use with the dual-phase cascade multiplier circuit 50 shown in FIG. 10.

Figure 11:
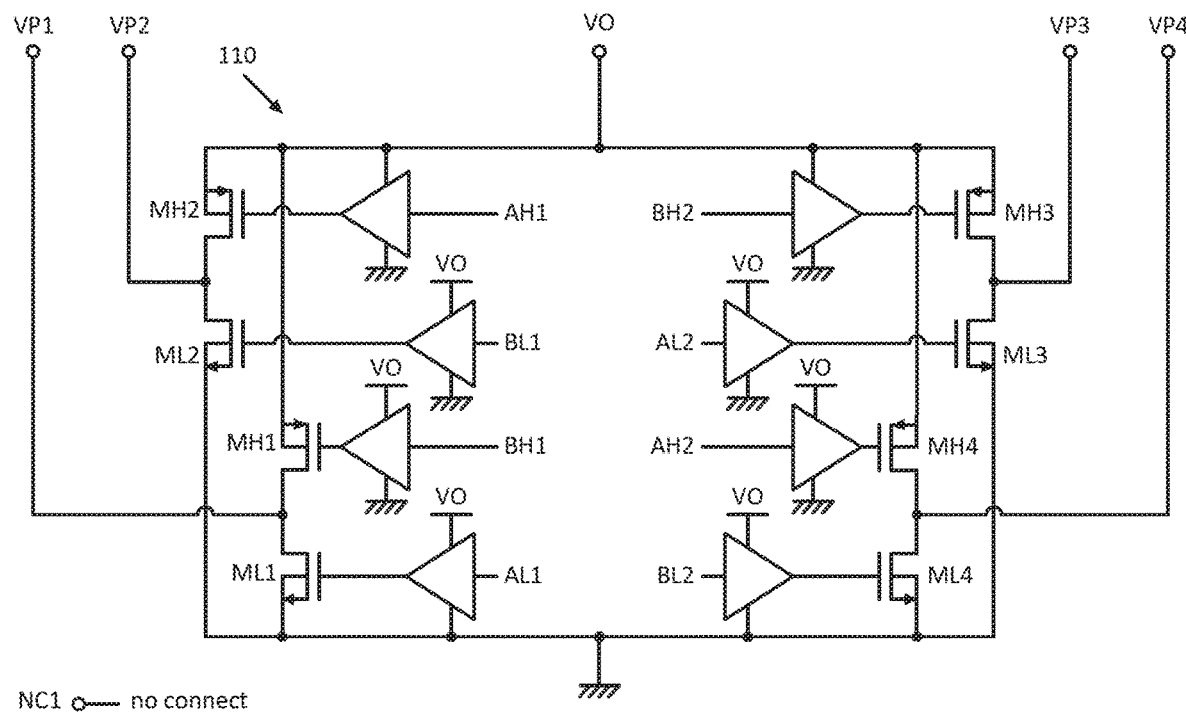
FIGS. 11-12 are schematics of two alternative phase generators for use with the circuit of FIG. 10.
Figure 12:
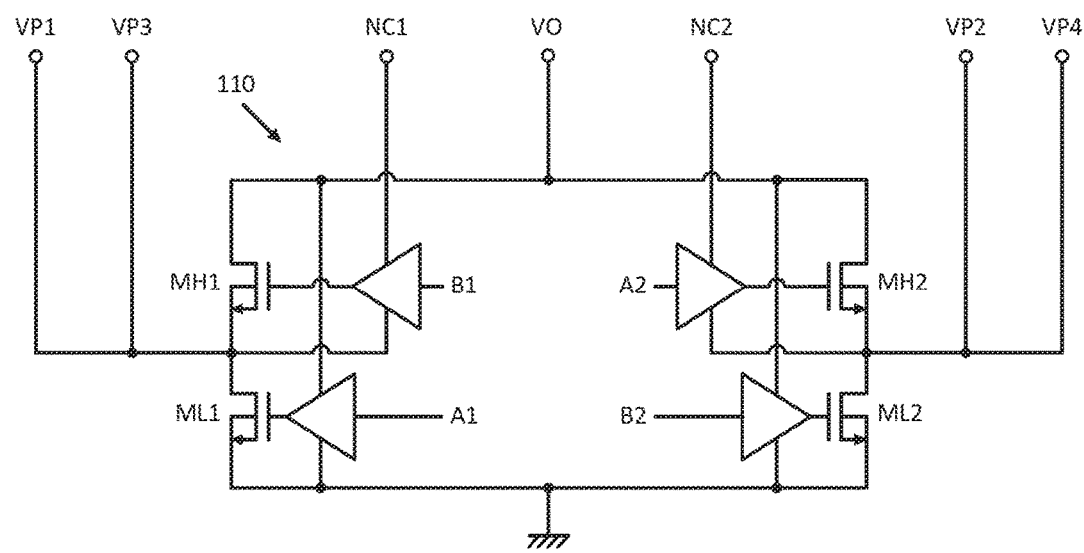

FIG. 11 illustrates a phase generator 110 that receives an output voltage VO and produces first, second, third, and fourth phase voltages VP1-VP4. The first and second phase voltages VP1, VP2 correspond to the first phase of the cascade multiplier circuit 50 while the third and fourth phase voltages VP3, VP4 correspond to the second phase of the cascade multiplier circuit 50.

The phase generator 110 features four transistor pairs, wherein each transistor pair generates one of the phase voltages VP1-VP4. A first pair of transistors MH1, ML1 generates the first phase voltage VP1; a second pair of transistors MH2, ML2 generates the second phase voltage VP2; a third pair of transistors MH3, ML3 generates the third phase voltage VP3; and a fourth pair of transistors MH4, ML4 generates the fourth phase voltage VP4. In each transistor pair, the high-side transistor (e.g. MH1) is a PMOS device while the low-side transistor (e.g. ML1) is a NMOS device.

Separate gate driver circuits control each transistor in the phase generator 110, thereby allowing tri-state operation of each transistor pair. The output voltage VO powers each gate driver circuit. The gate driver circuits can be implemented using numerous circuit topologies, such as the tapered gate driver illustrated in FIG. 6. Each gate driver circuit receives a driver signal with a label beginning with either an "A" or a "B". The driver signals AL1, BL1, AL2, BL2 control low-side transistors ML1, ML2, ML3, ML4, respectively while the driver signals BH1, AH1, BH2, AH2 control high-side transistors MH1, MH2, MH3, MH4, respectively.

In normal operation, the phase generator 110 cycles between a first state and a second state at a specific frequency. During the first state, the gate driver circuits that receive a "B" signal activate their corresponding transistors and the gate driver circuits that receive an "A" signal de-activate their corresponding transistors. Consequently, the first and third phase voltages VP1, VP3 are equal to the output voltage VO while the second and fourth phase voltages VP2, VP4 are equal to zero volts.

In contrast, during the second state, the gate driver circuits that receive a "B" signal de-activate their corresponding transistors and the gate driver circuits that receive an "A" signal activate their corresponding transistors. Consequently, the first and third phase voltages VP1, VP3 are equal to zero volts while the second and fourth phase voltages VP2, VP4 are equal to the output voltage VO.

FIG. 12 illustrates an alternative phase generator 110 that receives an output voltage VO and produces first, second, third, and fourth phase voltages VP1-VP4. In a dual-phase design, the first and third phase voltages VP1, VP3 are in phase; and the second and fourth phase voltages VP2, VP2 are in phase. Consequently, as illustrated in FIG. 12, the first and third phase voltages VP1, VP3 can be shorted together and the second and fourth phase voltages VP2, VP4 can be shorted together.

Additionally, high-side transistors MH1, MH2 can utilize NMOS transistors instead of PMOS transistors as in FIG. 11. The higher mobility of electrons in NMOS transistors allows for the use of smaller high-side transistors MH1, MH2, thereby reducing the energy required to activate. Because NMOS transistors require a gate voltage higher than their source to activate, the high-side transistors MH1, MH2 derive this boost voltage from the pump capacitors within the cascade multiplier that the phase generator 110 is driving.

For example, if the phase generator 110 is coupled to the cascade multiplier circuit 50, then the gate driver of the high-side transistor MH1 is coupled to the positive terminal of the pump capacitor C1A from phase one. In contrast, the gate driver of the high-side transistor MH2 is coupled to the positive terminal of the pump capacitor C1B from phase two. Therefore, each gate driver and its corresponding high-side transistor is powered by a pump capacitor from a distinct parallel charge transfer path.

Because of the similarity of the phase generators 110 in FIGS. 11-12, the operation of the phase generator 110 in FIG. 12 operates as described in connection with FIG. 11. The differences mainly being the shorted phase voltages and boosted high-side transistors MH1, MH2.

Figure 13:
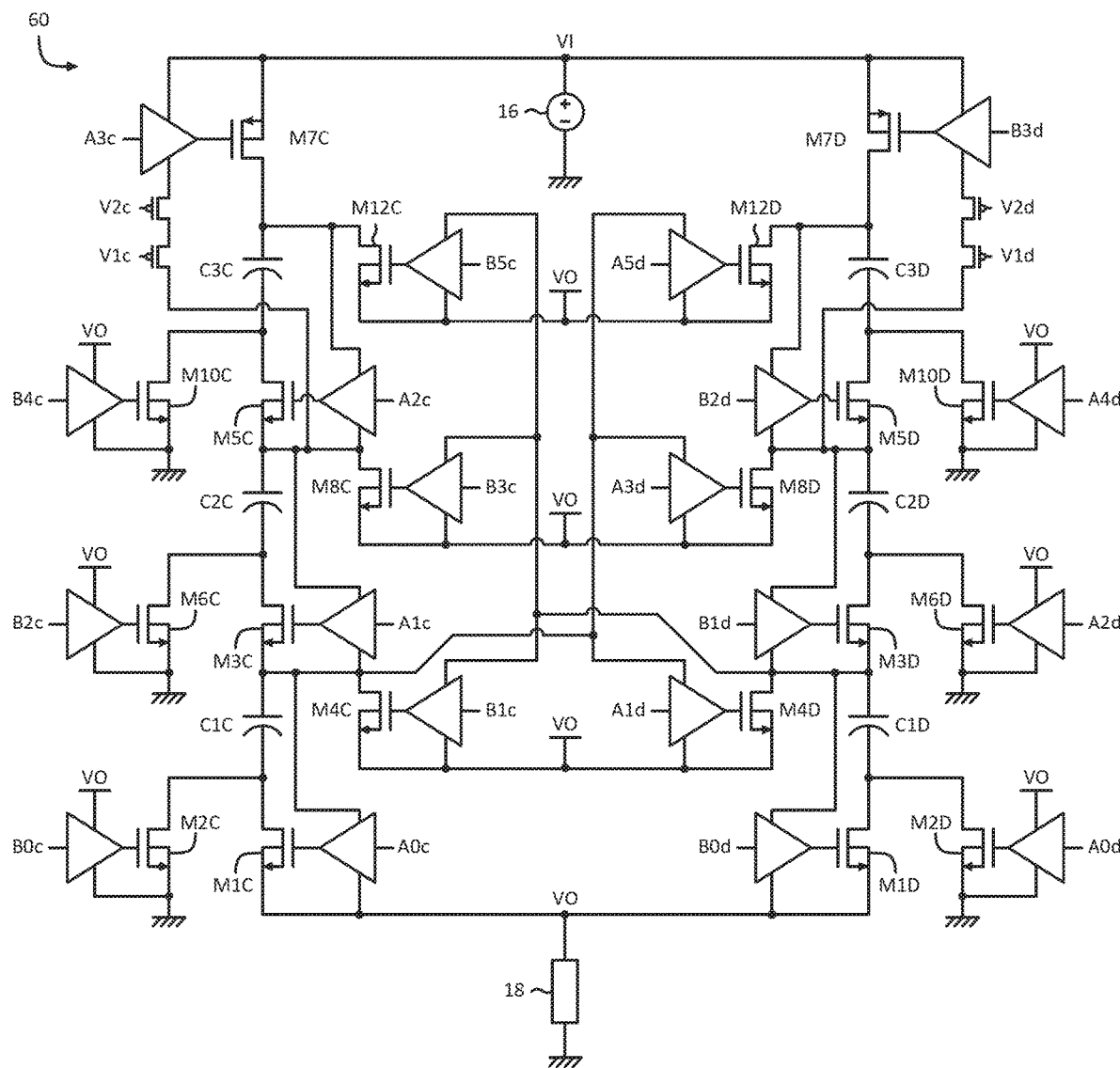
FIG. 13 is a schematic of a dual-phase series-parallel switched capacitor converter and corresponding gate drivers.

A number of alternatives to the switched capacitor power converter designs discussed make use of the approaches embodied in those designs. For example, the converter illustrated in FIG. 13 is a dual-phase series-parallel switched capacitor circuit 60 that includes some gate drivers that are powered by capacitors in either the same charge transfer path or a parallel charge transfer path.

The switched capacitor circuit 60 includes a pair of phases. A first phase includes capacitors C1C-C3C, odd transistors M1C-M7C, and even transistors M2C-M12C. Similarly, a second phase includes capacitors C1D-C3D, odd transistors M1D-M7D, and even transistors M2D-M12D. All of the transistors coupled with signals having an "A" prefix through corresponding gate drivers are activated and de-activated at the same time; as is the case for all of the transistors coupled with signals having a "B" prefix through corresponding gate drivers.

The switched capacitor circuit 60 produces an output voltage VO that is four times lower than an input voltage VI by cycling between a first state and a second state at a specific frequency. During the first state, the first phase odd transistors M1C-M7C and the second phase even transistors M2D-M12D are activated while the first phase even transistors M2C-M12C and the second phase odd transistors M1D-M7D are de-activated. This switch activation pattern places the second phase capacitors C1D-C3D in parallel with the load 18 and places a series arrangement of the first phase capacitors C1C-C3C in between the source 16 and the load 18.

In contrast, during the second state, the first phase odd transistors M1C-M7C and the second phase even transistors M2D-M12D are de-activated while the first phase even transistors M2C-M12C and the second phase odd transistors M1D-M7D are activated. This switch activation pattern places the first phase capacitors C1C-C3C in parallel with the load 18 and places a series arrangement of the second phase capacitors C1D-C3D in between the source 16 and the load 18.

Unlike either of the dual-phase cascade multiplier circuits 40 or 50, within a single phase of the switched capacitor circuit 60, the gate drivers derive their power from capacitors in both phases. For example, the gate drivers for the corresponding transistors M1C, M3C, M5C are powered from the capacitors C1C, C2C, C3C, respectively while the gate drivers for the corresponding transistors M4C, MBC, M12C are powered from the capacitor C1D.

Furthermore, the voltage stress across the transistors in a series-parallel switched capacitor power converter can be quite high in comparison to cascade multipliers. Assuming the input voltage VI is equal to twenty volts then the maximum voltage across the transistors M12C, M12D is fifteen volts. In this embodiment, the gate-to-source voltage is always five volts and the gate drivers for the top PMOS transistors require two series connected voltage followers that are biased using voltages V1c-V2d.

Although described in the context of single-phase and dual-phase converters, it should be understood that other multi-phase converter configurations can be used. For example, a four-phase cascade multiplier can be constructed by placing two copies of the cascade multiplier circuit 40 in parallel and shifting their respective clocks by ninety degrees. Adding an even number of phases is straightforward because every subsequent pair of phases can be run in isolation.

However, if the switched capacitor power converter includes an odd number of phases, it is a little more difficult to power gate drivers from capacitors in different parallel charge transfer paths. In this case, each gate driver draws power from capacitors in multiple parallel charge transfer paths, as compared to a single parallel charge transfer path in the even-numbered phase case.

In general, switched capacitor converters feature a large number of switches and capacitors. By necessity, at least a few of the switches are floating, which means that neither switch terminal is attached to a constant electric potential. It should be appreciated that switched capacitor converters that have at least one floating switch can benefit by deriving power from the same charge transfer path or a parallel charge transfer path. Examples of such switched capacitor converters include the cascade multiplier, series-parallel, parallel-series, Fibonacci, and voltage-doubler topologies.

The switched capacitor power converters and the associated gate drivers illustrated herein can all be integrated on one or multiple semiconductor substrates. If all of the transistors are integrated on a single substrate and any of the transistors are floating then the transistors must be isolated from the substrate. For example, in a CMOS process, NMOS transistors are typically formed in a p-type substrate. These devices can only float if the bulk of the NMOS transistors is isolated from the substrate. If this were not the case, then an alternative possibility would be to use multiple semiconductor substrates.

The capacitors in a switched capacitor power converter can either be integrated, discrete, or a combination thereof. The discrete capacitors are typically multi-layer ceramic capacitors while the integrated capacitors are typically planar or trench capacitors. If the capacitors are integrated, then they can be integrated on the same wafer with their switches, or they can be integrated on a separate wafer, or a combination thereof. Furthermore, if the capacitors and switches are on different wafers then there are various attachment methods, some of which remove the pin count limitation of the overall converter.

The ability to re-purpose the pump capacitors is of benefit when the switched capacitor power converter uses either integrated capacitors or discrete capacitors. If discrete capacitors are used, then each capacitor uses at least one pin. Adding extra pins for the gate driver circuitry is quite painful because pins on an integrated circuit are of limited supply for a given die area. On the other hand, integrated capacitors do not eat into your pin count, but they are quite expensive and have a low capacitance per area so it is valuable to limit their use.

Typically, a controller produces control signals for activating and de-activating the switches within a switched capacitor power converter. For example, in most of the embodiments described above, a controller could have generated the driver signals that are labeled with an "A" or a "B" prefix. By controlling the on and off time of the individual switches, a controller can provide many functions. A few such functions include the ability to regulate the output voltage, the ability to shut off the power converter in the event of a fault condition, and the ability to change the gain of the switched capacitor network.

Various features, aspects, and embodiments of switched capacitor power converters have been described herein. The features, aspects, and numerous embodiments described are susceptible to combination with one another as well as to variation and modification, as will be understood by those having ordinary skill in the art. The present disclosure should, therefore, be considered to encompass such combinations, variations, and modifications. Additionally, the terms and expressions which have been employed herein are used as terms of description and not of limitation. There is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

Having described the invention and a preferred embodiment thereof, what is claimed as new and secured by Letters Patent is:

1. An apparatus comprising:
a clock to generate one or more clock signals;
a controller to generate one or more control signals based, at least in part, on the one or more clock signals; and
a charge pump comprising a plurality of pump capacitors coupled to a plurality of switches along a charge transfer path between an input port and an output port of the charge pump, a plurality of switches to include one or more transistor-type switches to be driven by corresponding gate drivers and controllable to switch between successive states, wherein, in the successive states, the one or more transistor-type switches to interconnect the plurality of pump capacitors to at least one of the input port and the output port of the charge pump, wherein, during operation of the charge pump, at least one gate driver of the corresponding gate drivers to be powered by a charge to be stored on at least one of the plurality of pump capacitors in a manner so as to maintain a voltage across the at least one gate driver at a level to be substantially lower than a voltage at the input port of the charge pump.

2. The apparatus of claim 1, wherein the charge pump to provide time-varying voltages to one or more gate drivers of the corresponding gate drivers.

3. The apparatus of claim 1, wherein a particular switch of the plurality of switches to have a corresponding maximum voltage rating less than the voltage at the input port of the charge pump.

4. The apparatus of claim 1, wherein the plurality of pump capacitors to have respective first and second nodes, and wherein, during operation of the charge pump, a voltage at the first nodes to be higher than a voltage at the second nodes.

5. The apparatus of claim 4, wherein the plurality of pump capacitors to include at least a first pump capacitor and a second pump capacitor, the first node of the first pump capacitor to be coupled to the first node of the second pump capacitor via at least one switch of the plurality of switches.

6. The apparatus of claim 5, wherein the second node of the first pump capacitor to be coupled to a first phase voltage and wherein the second node of the second pump capacitor to be coupled to a second phase voltage.

7. The apparatus of claim 6, wherein the first phase voltage is to be different from the second phase voltage.

8. The apparatus of claim 1, wherein the at least one gate driver to include a first gate driver and a second gate driver, and wherein one or more transistor-type switches to include at least a first transistor-type switch and a second transistor-type switch to be respectively driven by the first gate driver and the second gate driver.

9. The apparatus of claim 8, wherein the at least one of the plurality of pump capacitors to include a first pump capacitor having a first voltage and a second pump capacitor having a second voltage, and wherein the first gate driver to be powered by the first pump capacitor and the second gate driver to be powered by the second pump capacitor.

10. The apparatus of claim 9, wherein the first voltage is to be different from the second voltage.

11. An apparatus comprising:
a controller to generate one or more control signals based, at least in part, on one or more clock signals, the one or more control signals to include one or more driver signals; and
a charge pump comprising a plurality of switches operable via corresponding gate drivers to interconnect a plurality of capacitors between an input port and an output port of the charge pump in successive states to form a plurality of charge transfer paths, the plurality of charge transfer paths to couple the plurality of capacitors in the successive states to at least one of the input port and the output port,
wherein the plurality of charge transfer paths to comprise at least a first charge transfer path and a second transfer path, the first charge transfer path to include at least one switch of the plurality of switches and operable via a particular gate driver of the corresponding gate drivers based, at least in part, on the one or more driver signals to be received by the particular gate driver, and
wherein the particular gate driver to be powered by a charge to be stored on at least one capacitor to be coupled along the second charge transfer path.

12. The apparatus of claim 11, wherein the charge pump to provide a time-varying voltage to one or more gate drivers of the corresponding gate drivers.

13. The apparatus of claim 11, wherein the at least one switch of the plurality of switches to have a maximum voltage rating less than a voltage at the input port or a voltage at the output port of the charge pump.

14. The apparatus of claim 11, and further comprising a phase generator to generate a phase voltage for at least one capacitor to be coupled along the first charge transfer path using a voltage from the at least one capacitor to be coupled along the second charge transfer path.

15. The apparatus of claim 11, wherein the charge pump comprises a cascade-multiplier.

16. The apparatus of claim 11, wherein the charge pump comprises a power converter.

17. The apparatus of claim 16, wherein the power converter comprises a series-parallel switched-capacitor power converter.

18. The apparatus of claim 16, wherein the power converter comprises a multi-phase series-parallel switched-capacitor power converter.

19. The apparatus of claim 11, wherein at least one of the corresponding gate drivers to be coupled to a pair of series-connected voltage followers.

20. The apparatus of claim 11, wherein the one or more control signals to be used, at least in part, for at least one of the following: to regulate a voltage at the output port of the charge pump; to change a gain of the charge pump; to shut off the charge pump in response to a detection of a fault condition; or any combination thereof.

* * * * *